United States Patent
Gopalraju et al.

(10) Patent No.: US 10,063,130 B2
(45) Date of Patent: Aug. 28, 2018

(54) MULTI-STAGE AMPLIFIER

(71) Applicant: Intersil Americas LLC, Milpitas, CA (US)

(72) Inventors: Seenu Gopalraju, San Jose, CA (US); Rhys Philbrick, San Jose, CA (US); Ruchi Parikh, Mountain View, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 364 days.

(21) Appl. No.: 14/741,867

(22) Filed: Jun. 17, 2015

(65) Prior Publication Data
US 2016/0087595 A1 Mar. 24, 2016

Related U.S. Application Data

(60) Provisional application No. 62/052,565, filed on Sep. 19, 2014.

(51) Int. Cl.
*H02M 1/08* (2006.01)
*H02M 3/158* (2006.01)
*H02M 1/00* (2006.01)

(52) U.S. Cl.
CPC ............ *H02M 1/08* (2013.01); *H02M 3/158* (2013.01); *H02M 2001/0032* (2013.01); *Y02B 70/16* (2013.01)

(58) Field of Classification Search
CPC .................................................. H02M 1/08
USPC ......................................................... 330/310
See application file for complete search history.

(56) References Cited

U.S. PATENT DOCUMENTS

| | | | | |
|---|---|---|---|---|
| 3,864,734 A * | 2/1975 | Gish | ...................... | G11B 5/035 360/41 |
| 4,242,741 A * | 12/1980 | Parrish | ..................... | G01V 1/22 330/258 |
| 2002/0039028 A1* | 4/2002 | Douglas | ................... | G01R 1/07 324/658 |
| 2010/0289568 A1* | 11/2010 | Eschauzier | ............ | H03F 3/347 330/9 |
| 2013/0033244 A1* | 2/2013 | Ock | .......................... | G05F 1/56 323/280 |
| 2014/0070889 A1* | 3/2014 | Chen | ..................... | H03F 1/0211 330/295 |

* cited by examiner

*Primary Examiner* — Patricia T Nguyen
(74) *Attorney, Agent, or Firm* — Foley & Lardner LLP (57) ABSTRACT

In an embodiment, an amplifier includes first, second, and third stages, and a feedback network. The first stage has a first passband and is configured to generate a first output signal in response to first and second input signals, and the second stage has a second passband that is higher in frequency than the first passband and is configured to generate a second output signal in response to third and fourth input signals. The third stage has a first input node coupled to receive the first output signal, a second input node coupled to receive the second output signal, and an output node. And the feedback network is coupled between the second input node and the output node of the third stage. For example, where the first, second, and third stages are respective operational-transconductance-amplifier stages, such an amplifier may be suitable for low-power applications.

25 Claims, 6 Drawing Sheets

MULTI-STAGE AMPLIFIER

PRIORITY CLAIM

The present application claims priority from U.S. Provisional Patent Application No. 62/052,565, filed 19 Sep. 2014, which application is incorporated herein by reference in its entirety.

SUMMARY

In an embodiment, an amplifier includes first, second, and third stages, and a feedback network. The first stage has a first passband and is configured to generate a first output signal in response to first and second input signals, and the second stage has a second passband that is higher in frequency than the first passband and is configured to generate a second output signal in response to third and fourth input signals. The third stage has a first input node coupled to receive the first output signal, a second input node coupled to receive the second output signal, and an output node. And the feedback network is coupled between the second input node and the output node of the third stage.

For example, where the first, second, and third stages are respective operational-transconductance-amplifier stages, such an amplifier may be suitable for low-power applications because it may consume less standby power and may require less power and time to turn on and to turn off. Furthermore, such an amplifier may provide separation of the first and second output signals such that the first stage does not affect the operation of the second stage, and vice-versa. For example, such separation may reduce or eliminate the reflection of the input offset of the first stage to the second stage, and vice-versa. Moreover, such separation may allow compensation of the input offset of the first stage independently of the second stage, and vice-versa. In addition, such separation may allow compensation of the input offset of one of the first and second stages independently of the signal characteristics (e.g., bandwidth) of the one stage.

DETAILED DESCRIPTION

Figure 1:
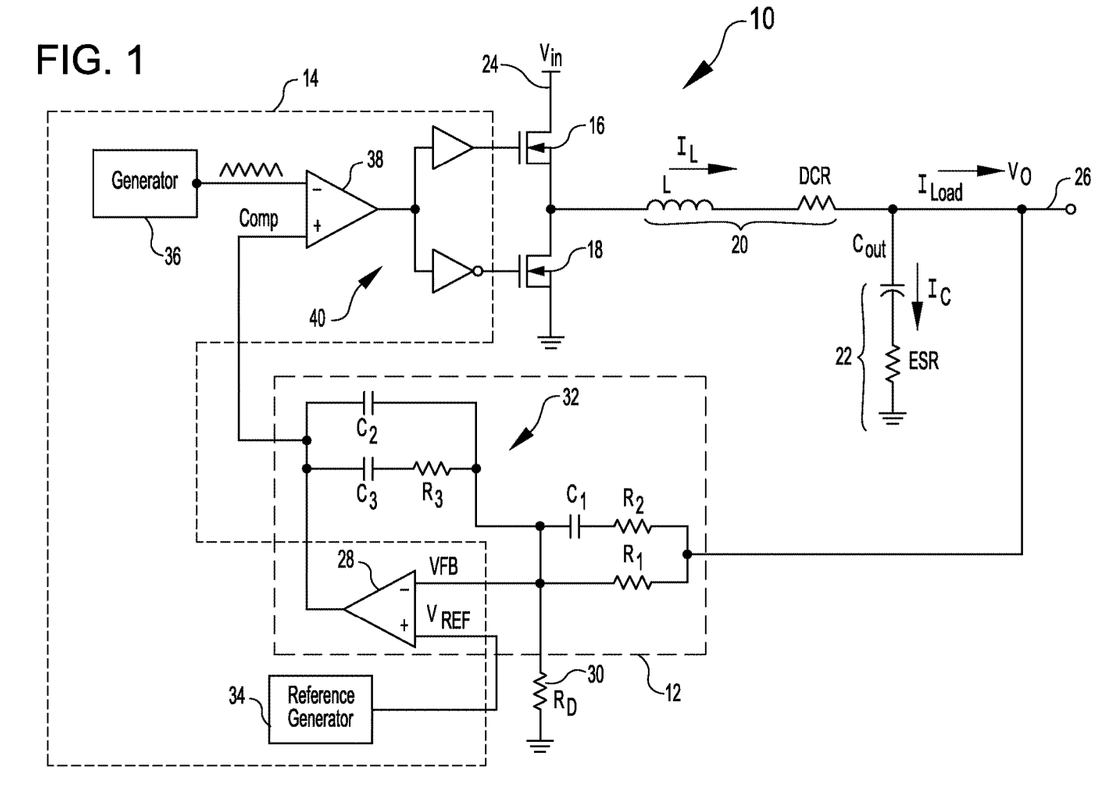
FIG. 1 is a diagram of a power supply with a conventional error-amplifier circuit.

FIG. 1 is a diagram of a power supply 10, according to an embodiment; although described as being a buck converter, the power supply may be any other type of power supply, such as a boost converter or a buck-boost converter, that includes an error-amplifier circuit such as an error-amplifier circuit 12.

In addition to the error-amplifier circuit 12, the power supply 10 includes a power-supply controller 14, high-side and low-side switching transistors 16 and 18, an inductor 20 having an inductance L and an equivalent series resistance DCR, an output (filter) capacitor 22 having a capacitance C and an equivalent series resistance ESR, an input node 24, and an output node 26.

The error-amplifier circuit 12 (which may also be called a "compensation circuit") includes a high-gain differential error amplifier 28, such as an operational amplifier, which is disposed on the power-supply controller 14, a dividing resistor 30, and a compensation network 32 with components having the values shown in FIG. 1. The value $R_D$ of the dividing resistor 30 is such that ideally, a feedback voltage $$V_{FB} = \frac{R_D}{R_D + R_1} \cdot V_O = V_{REF}$$

when the output voltage $V_O$ has a regulated value; if the power supply 10 is designed such that the regulated value of $V_O$ equals $V_{REF}$, then the dividing resistor 30 may be omitted. The compensation network 32 imparts to the error-amplifier circuit 12 at least three poles and at least two zeros in the frequency band of interest such that within this frequency band, the error-amplifier circuit has a lower-frequency passband and a higher-frequency passband separated by a frequency band of lower gain; therefore, the error-amplifier circuit 12 is a Type III error-amplifier circuit. The lower-frequency pass band allows the power supply 10 to stably respond to relatively slow changes in $V_O$, such as caused by relatively slow changes in the power-supply load (not shown in FIG. 1) or in the input voltage $V_{IN}$ (e.g., due to a discharging battery that provides $V_{IN}$), while filtering out noise within the frequency band of lower gain; and the higher-frequency pass band allows the power supply to respond to relatively fast, i.e., transient, changes in $V_O$, such as caused by a load-insertion transient or by a load-release transient.

In addition to the error amplifier 28, the power-supply controller 14 includes a bandgap-reference generator 34 for generating $V_{REF}$, a sawtooth-wave generator 36, a comparator 38, and switching logic 40.

The error-amplifier circuit 12 and the comparator 38 form a part of a feedback loop that regulates the output voltage $V_O$ generated by the power supply 10 such that, ideally, during steady-state operation of the power supply, $$V_O = \frac{R_D + R_1}{R_D} \cdot V_{REF}.$$

During operation of the power supply 10, the power-supply controller 14 controls the duty cycle of the transistors 16 and 18 to regulate $V_O$ ideally to $$\frac{R_D + R_1}{R_D} \cdot V_{REF}$$

as described below.

The error amplifier 28 generates an output voltage COMP having a value that ideally maintains $V_{FB}=V_{REF}$, where the rate at which the error amplifier can change COMP in response to a change in $V_{FB}$ depends on the frequency response that the compensation network 32 imparts to the error-amplifier circuit 12.

The comparator 38 compares COMP to a sawtooth voltage wave SAWTOOTH generated by the sawtooth-wave generator 36; the period and frequency of SAWTOOTH are the switching period and switching frequency, respectively, of the power supply 10.

While the amplitude of SAWTOOTH is less than the amplitude of COMP, the comparator 38 generates, on its output node, a high signal level, in response to which the switching logic 40 turns on the high-side transistor 16 and turns off the low-side transistor 18.

Conversely, while the amplitude of SAWTOOTH is greater than the amplitude of COMP, the comparator 38 generates, on its output node, a low signal level, in response to which the switching logic 40 turns off the high-side transistor 16 and turns on the low-side transistor 18. The ratio of the time per switching period that the high-side transistor 16 is on to the switching period itself is the aforementioned duty cycle of the power supply 10.

While the high-side transistor 16 is turned on and the low-side transistor 18 is turned off, a linearly increasing current $I_L$ flows from the input node 24, through the transistor 16, through the inductor 20, and to the output node 26. A portion $I_C$ of $I_L$ flows into the capacitor 22 and causes $V_O$ to increase, and a portion $I_{LOAD}$ of $I_L$ powers a load (not shown in FIG. 1) coupled to the output node 26.

Conversely, while the high-side transistor 16 is turned off and the low-side transistor is turned on, a linearly decreasing current $I_L$ flows from ground, through the transistor 18, through the inductor 20, and to the output node 26. A portion $I_C$ of $I_L$ flows into the capacitor 22 and causes $V_O$ to increase, and a portion $I_{LOAD}$ of $I_L$ powers a load (not shown in FIG. 1) coupled to the output node 26. However, when $I_L$ becomes lower than $I_{LOAD}$, $I_C$ reverses direction; that is, the capacitor 22 sources a linearly increasing difference current $I_C=I_{LOAD}-I_L$ to the load. While the capacitor 22 sources $I_C$ to the load, $V_O$ decreases.

The peak-to-peak magnitude of this periodic increase and decrease in $V_O$, which is sometimes called "output ripple voltage" is relatively small, for example, on the order of a few millivolts (mV) for a 1.3 Volt (V) supply. Therefore, the ideal value of $$V_O = \frac{R_D + R_1}{R_D} \cdot V_{REF}$$

is actually the average, or DC component, of the voltage on the output node 26.

If an event, e.g., a change in $V_{IN}$ due to battery discharge (if $V_{IN}$ is supplied by a battery) or a load transient, causes a change in $V_O$, then the power supply 10 acts to move $V_O$ back toward its regulated value, which, per above, is ideally $$\frac{R_D + R_1}{R_D} \cdot V_{REF}.$$

For example, if $V_O$ increases above its regulated value, ideally $$\frac{R_D + R_1}{R_D} \cdot V_{REF},$$

then the power supply 10 acts to decrease $V_O$ back to $$\frac{R_D + R_1}{R_D} \cdot V_{REF}.$$

it $V_O$ increases, then $V_{FB}$ increases, and the error-amplifier circuit 12 decreases COMP. This decrease in COMP reduces the power-supply duty cycle such that the on time of the high-side transistor 16 decreases, thus decreasing the average current $I_{Lavg}$ that the inductor 20 provides to the output node 26. This decrease in $I_{Lavg}$ causes $V_O$ to decrease back toward its ideal regulated value $$\frac{R_D + R_1}{R_D} \cdot V_{REF}.$$

Conversely, if $V_O$ decreases below its regulated value, ideally $$\frac{R_D + R_1}{R_D} \cdot V_{REF},$$

then the power supply 10 acts to increase $V_O$, ideally back to $$\frac{R_D + R_1}{R_D} \cdot V_{REF}.$$

If $V_O$ decreases, then $V_{FB}$ decreases, and the error-amplifier circuit 12 increases COMP. This increase in COMP increases the power-supply duty cycle such that the on time of the high-side transistor 16 increases, thus increasing the average current $I_{Lavg}$ that the inductor 20 provides to the output node 26. This increase in $I_{Lavg}$ causes $V_O$ to increase back toward its regulated value, ideally $$\frac{R_D + R_1}{R_D} \cdot V_{REF}.$$

Alternate embodiments of the power supply 10 are contemplated. For example, any components of the power supply 10 described as being remote from the power-supply controller 14 may be disposed on the controller, and any components described as being on the controller may be disposed remote from the controller. Furthermore, the power-supply controller 14 may be an integrated circuit that is disposed on one or more integrated-circuit dies. Moreover, the error-amplifier circuit 12 may be other than a Type III error-amplifier circuit. In addition, although the power supply 10 is described as having a single power phase, the power supply may have multiple phases each including a respective inductor 20, error-amplifier circuit 12, reference and sawtooth generators 34 and 36, comparator 38, switching logic 40, and transistors 16 and 18; or, the multiple phases may share a common error-amplifier circuit. Furthermore, the power-supply 10 may be in the form of a packaged power-supply module, where some or all of the components of the power supply are disposed within a module package.

Still referring to FIG. 1, for many applications, such as battery-powered applications (e.g., smart phones and pad computers), it may be preferred that during a standby or sleep mode, the standby current drawn by the power supply 10 is near, or at, a minimum level so as to save power and to extend the lifetime of the battery. Furthermore, for such applications it may be preferred that in general, the power supply 10 draw relatively low current, and thus consume relatively little power, during light-load, normal-load, and heavy-load conditions.

But even at relatively high switching frequencies of, e.g., 300 KHz-1 MHz, the sizes of the capacitances $C_1$-$C_3$ and resistances $R_1$-$R_3$ of the error-amplifier circuit 12 may result in a large R-C settling time that may cause a standby-mode recovery time of the error-amplifier circuit to exceed the power-up time specified for such applications. Furthermore, to have a specified stability margin at a specified bandwidth, and to have a specified input offset and linearity, the error-amplifier circuit 12 may draw too much current to be suitable for such low-power applications during at least one of light-load, normal-load, and heavy-load conditions.

Figure 2:
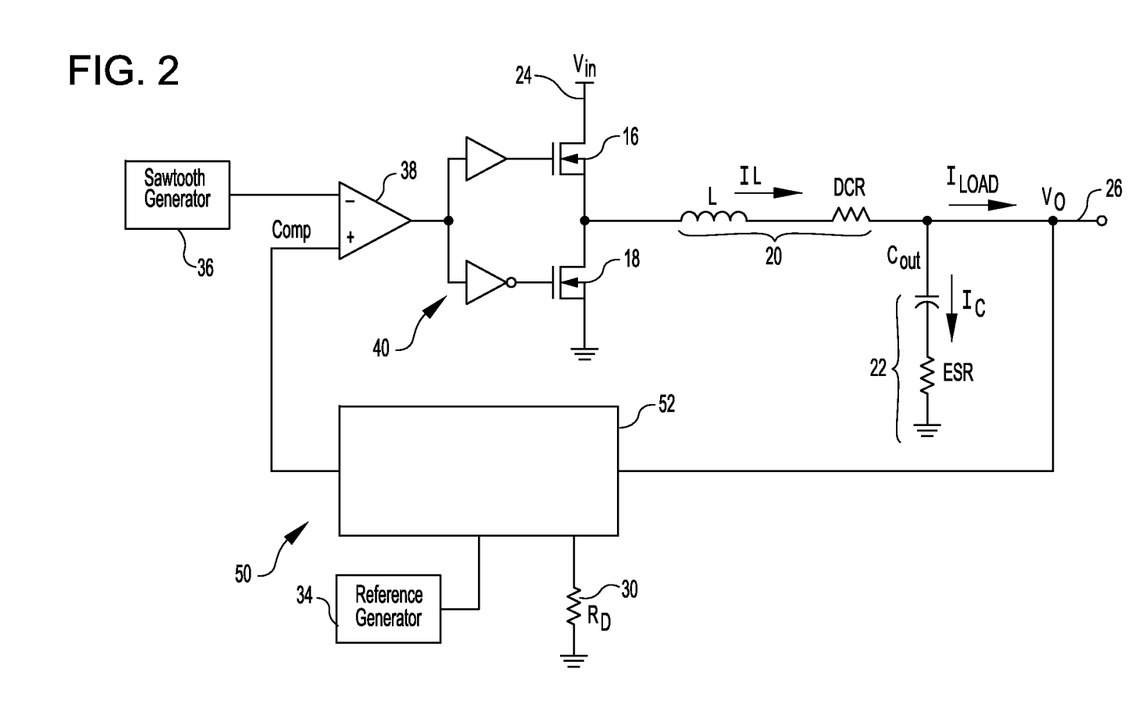
FIG. 2 is a diagram of a power supply with an error-amplifier circuit according to an embodiment.

FIG. 2 is a diagram of a power supply 50, which, according to an embodiment, includes an error-amplifier circuit 52 suitable for low-power applications as described above in conjunction with FIG. 1. Other than the error-amplifier 52, the power supply 50 may be similar to the power supply 10 of FIG. 1.

Figure 3:
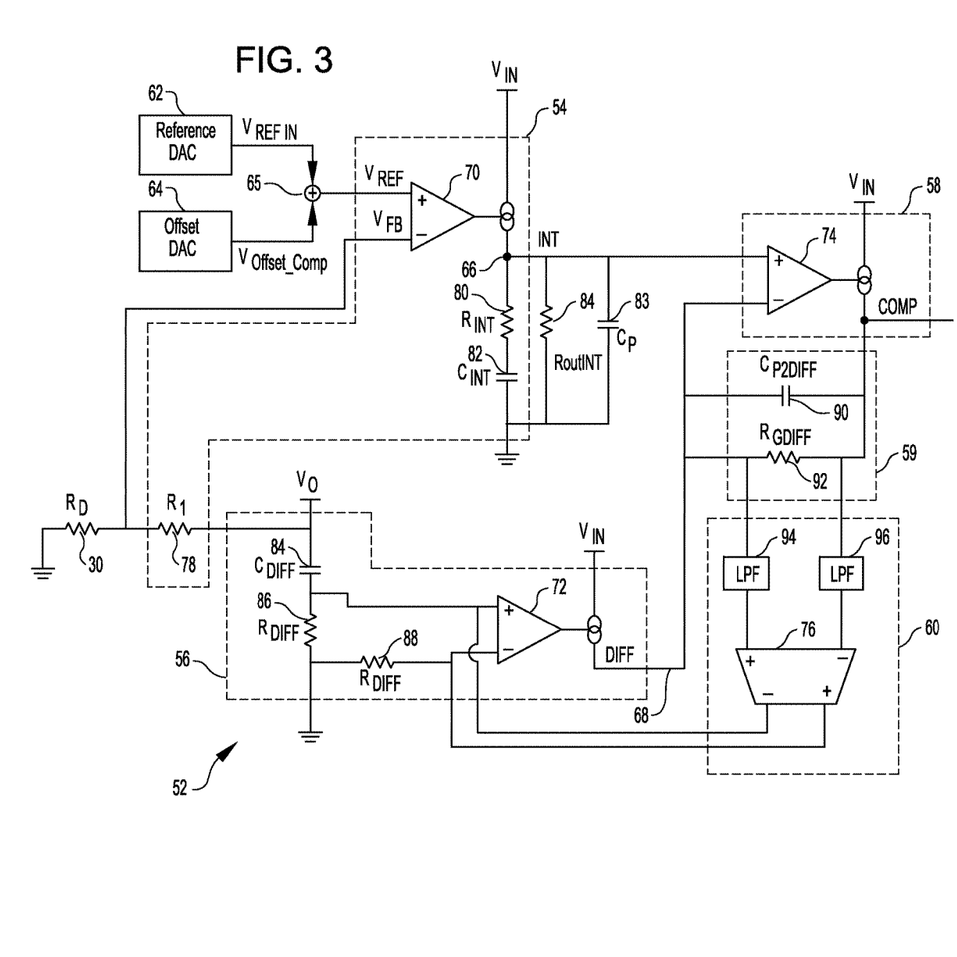
FIG. 3 is a diagram of an embodiment of the error-amplifier circuit of FIG. 2.

FIG. 3 is a diagram of the error-amplifier circuit 52, and the resistor 30 having a value $R_D$, according to an embodiment. The error-amplifier circuit 52 draws a low-enough standby current, and a low-enough operational current during light-load, normal-load, and heavy-load conditions, to be suitable for many low-power applications such as those described above in conjunction with FIG. 1.

As shown in FIG. 3 the error-amplifier circuit 52 includes a first stage that includes an integrator circuit 54, a second stage that includes a differentiator circuit 56, a third stage which includes a combiner circuit (sometimes called a buffer circuit) 58, a feedback stage 59 coupled between an input node and an output node of the combiner circuit 58, a differentiator-offset-compensation stage that includes an offset-compensation circuit 60, a reference generator 62, an integrator-offset-compensation-signal generator 64, and a summer 65. The integrator circuit 54 provides a lower-frequency passband for a first difference signal, the differentiator circuit 56 provides a higher-frequency signal path for a second difference signal, and the combiner circuit 58 combines the signals from the integrator and differentiator circuits such that output nodes 66 and 68 of the integrator and differentiator circuits, respectively, are electrically isolated from one another. Such electrical isolation prevents an input offset of one of the integrator and differentiator circuits 54 and 56 from being reflected to the input of the other of the integrator and differentiator circuits. Furthermore, the differentiator-offset-compensation circuit 60 reduces or eliminates any non-zero input offset voltage of the differentiator circuit 56.

The integrator, differentiator, buffer, and differentiator-offset-compensation circuits 54, 56, 58, and 60 each include a respective operational transconductance amplifier 70, 72, 74, and 76. Because operational transconductance amplifiers typically draw lower standby and operational currents than standard operational amplifiers do, the error-amplifier circuit 52 may be more suitable for low-power applications than the error-amplifier circuit 12 of FIG. 1.

In addition to the operational transconductance amplifier 70, the integrator circuit 54 has an input network, which includes a resistor 78 having a resistance value $R_1$, and an output integration network, which includes a resistor 80 having a resistance value $R_{INT}$, a capacitor 82 having a capacitance value $C_{INT}$, a parasitic capacitance 83 having a value $C_p$, and an output impedance of the transconductance amplifier 70, which output impedance is represented by a resistor 84 having a resistance value $R_{outINT}$. Furthermore, the transconductance amplifier 70 has a noninverting input node configured to receive a reference voltage $V_{REF}$, an inverting input node configured to receive a feedback voltage $V_{FB}$, and the output node 66 configured to carry a voltage INT that the transconductance amplifier 70 generates by driving an output current through the series combination of the resistor 80 and the capacitor 82.

In addition to the operational transconductance amplifier 72, the differentiator circuit 56 has an input differentiation network, which includes a capacitor 84 having a capacitance value $C_{DIFF}$ and a resistor 86 having a resistance value $R_{DIFF}$, and an offset-compensation resistor 88. Furthermore, the transconductance amplifier 72 has a noninverting input node coupled to the junction of the capacitor 84 and the resistor 86, an inverting input node coupled to the offset-compensation resistor 88, and the output node 68 configured to carry a voltage DIFF that the transconductance amplifier 72 generates by driving an output current through the feedback network 59.

The operational transconductance amplifier 74 of the combiner circuit 58 has a noninverting input node configured to receive the voltage INT from the integrator circuit 54, an inverting input node configured to receive the voltage DIFF from the differentiator circuit 56, and an output node configured to carry the voltage COMP (see FIG. 2) that the transconductance amplifier 74 generates by driving a current into the output node.

The a feedback network 59 is coupled between the inverting input node and the output node of the transconductance amplifier 74, and includes a capacitor 90 having a capacitance value $C_{P2DIFF}$ in parallel with a resistor 92 having a resistance value $R_{GDIFF}$.

And in addition to the fully differential operational transconductance amplifier 76, the differentiator-offset-compensation circuit 60 has input low-pass filters 94 and 96 with input nodes respectively coupled to the nodes of the resistor 92, a noninverting input node coupled to the output node of the low-pass filter 94, an inverting input node coupled to the output node of the low-pass filter 96, an inverting output node coupled to the noninverting input node of the transconductance amplifier 72, and a noninverting output node coupled to the inverting input node of the transconductance amplifier 72.

Still referring to FIG. 3, the reference generator 62 may include a programmable digital-to-analog converter (DAC) that generates a reference voltage $V_{REF\_IN}$, and the offset generator 64, which may include a programmable DAC that generates an integrator-offset-compensation voltage $V_{OFFSET\_COMP}$. The resolution of the DAC 64 may be greater than the resolution of the DAC 62, and the output-voltage range of the DAC 62 may be greater than the output-voltage range of the DAC 64.

The summer 65 combines, here by adding, $V_{REF\_IN}$ and $V_{OFFSET\_COMP}$ to generate the reference voltage $V_{REF}$.

In an embodiment, the transfer function of the error-amplifier circuit 52 is given by the following equation:

$$\frac{COMP}{V_o} = \frac{\beta gm_{INT} R_{outINT}(1 + sR_{INT} C_{INT}) \left(1 + sR_{DIFF} C_{DIFF}\left(1 + \frac{gm_{DIFF} R_{GDIFF}}{\beta gm_{INT} R_{INT}}\right)\right)}{[(1 + sR_{outINT} C_{INT})(1 + sR_{DIFF} C_{DIFF})(1 + sR_{GDIFF} C_{P2DIFF})]} \text{ where } = \frac{R_D}{R_D + R_1},$$

$g_{mINT}$ is the gain of the transconductance amplifier 70, and $g_{mDIFF}$ is the gain of the transconductance amplifier 72.

In an embodiment, at higher frequencies the value $R_{INT}$ of the resistor 80 may be influenced by the parasitic capacitance 83. Therefore, at such higher frequencies the effective value $R_{INT\_effective}$ of the resistor 80 may be given by the following equation:

$$R_{INT\_effective} = \frac{R_{INT}}{1 + sR_{INT} C_P}.$$

To account for this influence, one may substitute $R_{INT\_effective}$ for $R_{INT}$ in the transfer function.

Figure 5:
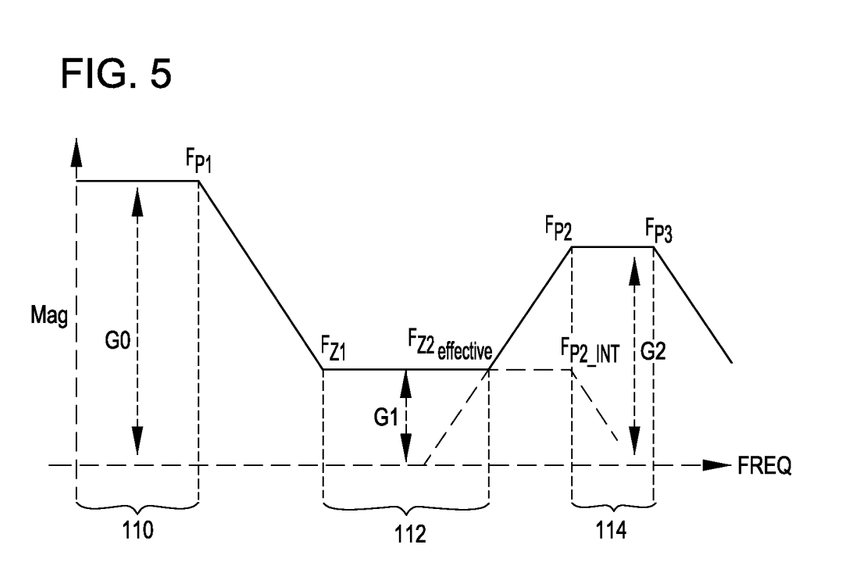
FIG. 5 is a plot of the gain of the error-amplifier circuit of FIG. 3 versus frequency, according to an embodiment.

Furthermore, in an embodiment, $R_{outINT} C_{INT} \gg R_{INT} C_{INT} > R_{DIFF} C_{DIFF} > R_{GDIFF} C_{P2DIFF}$ Moreover, in an embodiment, the combiner circuit 58 has approximately unity gain and an open-loop bandwidth that is greater than $$\frac{1}{2\pi R_{GDIFF} C_{P2DIFF}},$$

which is the pole frequency $F_{p3}$ as described below in conjunction with FIG. 5.

Figure 4:
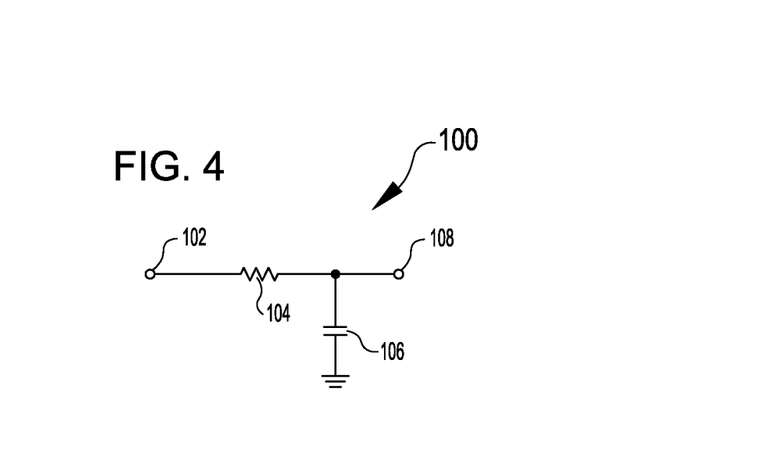
FIG. 4 is a diagram of an embodiment of the low-pass-filter circuits of FIG. 3.

FIG. 4 is a diagram of a low-pass filter 100, which may be suitable for each of the low-pass filters 94 and 96 of FIG. 3, according to an embodiment. The filter 100 is a first-order low-pass filter that includes an input node 102, a resistor 104, a capacitor 106, and an output node 108; a designer may select the values of the resistor and the capacitor according to the application. But any suitable low-pass filter may be used as the low-pass filters 94 and 96 of FIG. 3, and the filter 94 typically has a same topology and component values as the filter 96, although the filters 94 and 96 may have different topologies or component values.

FIG. 5 is a Bode plot of the gain-frequency response of the error-amplifier circuit 52 of FIG. 3, according to an embodiment.

A lower-frequency passband 110 of the error-amplifier circuit 52 extends from approximately 0 Hz to approximately a pole frequency $$F_{P1} = \frac{1}{2\pi \cdot R_{OUTINT} \cdot C_{INT}},$$

and is due mainly to the integrator circuit 54 ($R_{OUTINT}$ is the value of the output resistance 84 of the transconductance amplifier 70). The gain of the passband 110 is approximately flat at a value of approximately $G_0 = g_{mINT} \cdot R_{outINT}$, where $g_{mINT}$ is the open-loop transconductance of the transconductance amplifier 70. In an embodiment, $F_{P1}$ has a value within a range of approximately 2 Hz-600 Hz, and $G_0$ has value within a range of approximately of 55 dB-70 dB. The passband 110 allows the power supply 50 to respond to relatively slow changes in $V_O$ caused by, for example, changes in $V_{IN}$ (e.g., discharge of a battery providing $V_{IN}$) or changes in the load powered by the power-supply 50.

An approximately 20 dB-per-decade fall off of the gain of the error-amplifier circuit 52 from approximately $G_0$ to approximately $G_1 = g_{mINT} \cdot R_{INT}$ between approximately the pole frequency $F_{P1}$ and approximately a zero frequency $$F_{Z1} = \frac{1}{2\pi \cdot R_{INT} \cdot C_{INT}}$$

is mainly due to the pole of the integrator circuit 54 at $F_{P1}$. In an embodiment, $F_{Z1}$ has a value within a range of approximately of 1 KHz-20 KHz, and $G_1$ has a value within a range of approximately 6 dB-30 dB.

A mid-frequency reject band 112 extends from approximately the zero frequency $F_{Z1}$, which is due mainly to the integrator circuit 54, to approximately an effective zero frequency $$F_{Z2\_effective} = \frac{G_1 \cdot F_{P2}}{G_1 + G_2}$$

which does not represent a true zero, but which is the "crossover point" or "crossover frequency" where the differentiator circuit 56 begins to influence the gain of the error-amplifier stage 52. In an embodiment, $F_{Z2\_effective}$ has a value in a range of approximately 100 KHz or higher, and is at a lower frequency than a pole frequency $$F_{P2\_INT} = \frac{1}{2\pi R_{INT} C_P},$$

which is due mainly to the integrator circuit 54—note that the pole $F_{P2\_INT}$ does not affect the solid-line portion of the Bode plot because at frequencies above the effective zero frequency $F_{Z2\_effective}$, the signal-path of interest (and represented by the solid-line portion of the Bode plot) is the path through the differentiator circuit 56. Furthermore, the approximate gain $G_1$ of the reject band 112 is approximately flat and is due mainly to the integrator circuit 54. The reject band 112 filters out mid-frequency noise that may otherwise cause undesirable variation in the voltage COMP, and, therefore, that may otherwise cause undesirable variation in $V_O$.

An approximately 20 dB-per-decade rise of the gain of the error-amplifier circuit 52 from approximately $G_1$ to approximately $G_2 = g_{mDIFF} * R_{GDIFF}$ between approximately the effective pole frequency $F_{Z2\_effective}$ and approximately a pole frequency $$F_{P2} = \frac{1}{2\pi \cdot R_{DIFF} \cdot C_{DIFF}}$$

is mainly due to the effective zero of the differentiator circuit 56 at the frequency $F_{Z2\_effective}$, where $g_{mDIFF}$ is the open-loop transconductance of the transconductance amplifier 72; the frequency of the actual zero of the differentiator circuit 56 that causes this rise in the gain is less than the frequency of $F_{Z2\_effective}$. In an embodiment, the actual zero of the differentiator circuit 56 that results in $F_{Z2\_effective}$ is 0 Hz, $F_{P2}$ has a value within a range of approximately of 220 KHz-8 MHz, and $G_2$ has a value within a range of approximately 18 dB-40 dB.

A higher-frequency passband 114 of the error-amplifier circuit 52 extends from approximately the pole frequency $F_{P2}$, which is due mainly to the differentiator circuit 56, to approximately a pole frequency $$F_{P3} = \frac{1}{2\pi \cdot R_{GDIFF} \cdot C_{P2DIFF}},$$

which is due mainly to the feedback circuit 59. The gain of the passband 114 is approximately flat at a value of approximately $G_2$, and, in an embodiment, $F_{P3}$ has a value within an approximate range of 3 MHz to 10 MHz. The passband 114 allows the power supply 50 to respond to relatively fast changes in $V_O$ caused by, for example, a load-insertion transient or a load-release transient.

And from approximately the pole frequency $F_{P3}$, the gain of the error-amplifier circuit 52 falls from approximately $G_2$ at a rate of approximately 20 dB or more per decade depending on the other high-frequency parasitic poles of the differentiator circuit 56 and on the open-loop gain-bandwidth product of the combiner circuit 58.

Referring to FIGS. 3 and 5, alternate embodiments of the error-amplifier circuit 52 are contemplated. For example, the gains, pole frequencies, and zero frequencies may have different ranges of values than those disclosed above, and the gain profile may have a different shape than the shape described in conjunction with FIG. 5.

Referring to FIGS. 3-5, the operation of the error-amplifier circuit 52 is described, according to an embodiment. As described above, and as described in more detail below, the error-amplifier circuit 52 includes a $g_m$-based integrator circuit 54 and a $g_m$-based differentiator circuit 56, and also includes a $g_m$-based combiner circuit 58, which effectively sums together the integrator and differentiator output voltages INT and DIFF using a resistor $R_{GDIFF}$ in the feedback path of the combiner circuit instead of using, e.g., a summing junction. This "parallel" summing forms a slow and accurate lower-frequency path through the integrator circuit 54, and forms a fast, but less-accurate, higher-frequency path through the differentiator circuit 56, where these lower-frequency and higher-frequency paths are independent of one another. This path independence allows a slow offset-calibration loop, which includes the offset-compensation circuit 60, to compensate for the input offset voltage of the differentiator circuit 56 with little or no effect on the higher-frequency response of the differentiator circuit, and, thus, with little or no effect on the higher-frequency response of the error-amplifier circuit 52. This path independence also allows the integrator circuit 54 and the differentiator circuit 56 to have independent designs. For example, the integrator can be designed to have a low input-offset voltage, a high level of linearity, and a high level of accuracy, and the differentiator can be designed to have a high speed for fast reaction to load transients. This independent splitting of the design constraints of the integrator circuit 54 and of the differentiator circuit 56 allows the error-amplifier circuit 52 to have a relatively low input-offset voltage, a relatively high level of linearity, and a relatively high speed with a relatively simple and lower-power design.

Initially, the input offset voltage of the integrator circuit 54 is determined and compensated for during a calibration mode of the power supply 50; the power-supply controller 14 can implement this calibration, for example, whenever the power supply is activated but before the power-supply load (not shown in FIGS. 3-5) is activated. First, the power-supply controller 14 sets the reference DAC 62 to generate $V_{REF\_IN}$ at a programmed, or otherwise specified, value, and sets the offset-compensation DAC 64 to generate a mid-range value (e.g., 0 V) of $V_{OFFSET\_COMP}$ that is about halfway between the offset-compensation DAC's maximum and minimum output voltages. Next, the controller 14 compares $V_O$ to $$\frac{R_D + R_1}{R_D} \cdot V_{REF},$$

where the controller generates $$\frac{R_D + R_1}{R_D} \cdot V_{REF}$$

with, for example, analog circuitry including a calibration voltage divider having resistors with approximately the values $R_1$ and $R_D$, or from a look-up table. If $$V_O = \frac{R_D + R_1}{R_D} \cdot V_{REF}$$

within a specified tolerance, then the power-supply controller 14 exits the calibration mode. But if $$V_O \neq \frac{R_D + R_1}{R_D} \cdot V_{REF}$$

within the specified tolerance, then the power-supply controller 14 causes the DAC 64 to adjust $V_{OFFSET\_COMP}$ until $$V_O = \frac{R_D + R_1}{R_D} \cdot V_{REF}$$

within the specified tolerance. In response to $V_O$ equaling $$\frac{R_D + R_1}{R_D} \cdot V_{REF}$$

within the spewed tolerance, the power-supply controller 14 exits the calibration mode.

Because the input nodes of the differentiator circuit 56 have no DC path to $V_O$, the input offset voltage of the differentiator circuit is not compensated for in the manner described above for the integrator circuit 54. Instead, the input offset voltage of the differentiator circuit 56 is compensated for as described further below.

Next, the load (not shown in FIGS. 3-5) coupled to the power supply 50 is activated. This activation may be in response to a "power-supply-ready signal" (not shown in FIGS. 3-5) from the power-supply controller 14.

Then, the integrator circuit 54 and the differentiator circuit 56 act to maintain $V_O$ at is regulated value.

The integrator circuit 54 generates the voltage INT so as to maintain, ideally, $V_{REF}=V_{FB}$. For example, if $V_O$ decreases from its regulated value, thus causing $V_{FB}$ to decrease below $V_{REF}$, and if the decrease lasts long enough such that the frequency of the decrease is within the lower-frequency passband 110, then the transconductance amplifier 70 sources a current to the resistor 80 and the capacitor 82. This current increases the voltage INT, the increase in INT causes the combiner circuit 58 to increase the voltage COMP, and the increase in COMP tends to increase $V_O$ back toward its regulated value in a manner described above in conjunction with FIG. 1. Conversely, if $V_O$ increases from its regulated value, thus causing $V_{FB}$ to increase above $V_{REF}$, and if the increase lasts long enough such that the frequency of the increase is within the lower-frequency passband 110, then the transconductance amplifier 70 sinks a current from the resistor 80 and the capacitor 82. This current decreases the voltage INT, the decrease in INT causes the combiner circuit 58 to decrease the voltage COMP, and the decrease in COMP tends to decrease $V_O$ back toward its regulated value in a manner described above in conjunction with FIG. 1.

Similarly, the differentiator circuit 56 generates a voltage DIFF so as to maintain, ideally, the voltage across its input nodes at 0 V. For example, if $V_O$ decreases from its regulated value, and if the decrease is short enough such that the frequency of the decrease is within the higher-frequency passband 114, then this decrease causes a current to flow from ground through the resistor 86 and the capacitor 84, and this current causes the voltage from the noninverting input node to the inverting input node of the transconductance amplifier 72 to become negative. In response to this negative input voltage, the transconductance amplifier 72 sinks a current through the parallel combination of the capacitor 90 and the resistor 92 of the feedback circuit 50, thus causing an increase in the differential input voltage from the noninverting input node to the inverting input node of the transconductance amplifier 74. In response to this increase in its differential input voltage, the transconductance amplifier 74 sources an output current that increases COMP, and, therefore, that tends to increase $V_O$ back toward its regulated value in a manner described above in conjunction with FIG. 1. Conversely, if $V_O$ increases from its regulated value, and if the increase is short enough such that the frequency of the increase is within the higher-frequency passband 114, then this increase causes a current to flow through the capacitor 84 and the resistor 86 to ground, and this current causes the differential voltage from the noninverting input node to the inverting input node of the transconductance amplifier 72 to become positive. In response to this positive differential input voltage, the transconductance amplifier 72 sources a current through the parallel combination of the capacitor 90 and the resistor 92 of the feedback circuit 59, thus causing the differential input voltage from the noninverting input node to the inverting input node of the transconductance amplifier 74 to decrease. In response to this decrease in its differential input voltage, the transconductance amplifier 74 sinks an output current that decreases COMP, and, therefore, that tends to decrease $V_O$ back toward its regulated value in a manner described above in conjunction with FIG. 1.

Because the transconductance amplifier 74 electrically isolates the voltage signals INT and DIFF from one another, the input offset voltage of the transconductance amplifier 72, even if left uncompensated, does not reflect to the input of the transconductance amplifier 70. Furthermore, separating the higher-frequency and lower-frequency paths of the error-amplifier circuit 52 allows adjustment of the characteristics (e.g., gain, passband) of one of these paths with little or no effect on the characteristics of the other of these paths. Moreover, as discussed below, coupling the output current from the differentiator circuit 56 through a feedback circuit 59 (the capacitor 90 and resistor 92) allows the offset-compensation circuit 60 to compensate the input offset voltage of the transconductance amplifier 72 with little to no effect on the characteristics of the higher-frequency path of the error-amplifier circuit 52.

The offset-compensation circuit 60 acts to maintain the effective input offset voltage of the differentiator amplifier 72 at ideally 0 V. The offset compensation circuit 60 receives the voltage across the feedback circuit 59 via low-pass filters 94 and 96, and generates a differential compensation voltage across the input nodes of the transconductance amplifier 72 so as to maintain the lower-frequency voltage (e.g., the DC voltage) across the feedback circuit 59 at ideally 0 V. While the lower-frequency voltage across the feedback circuit 59 is at ideally 0 V, the current generated by the transconductance amplifier 72 is also ideally 0 Amperes (A), thus indicating that that the effective input-offset voltage of the transconductance amplifier 72 is ideally 0 V. For example, if a lower-frequency current sourced by the transconductance amplifier 72 through the resistor 92 of the feedback circuit 59 increases, and if the increase lasts long enough such that the frequency of the increase is within the passbands of the low-pass filters 94 and 96, then the offset-compensation circuit 60 generates, from the noninverting input node to the inverting node of the transconductance amplifier 72, a negative voltage that tends to reduce toward or to 0 A the magnitude of the current sourced by the transconductance amplifier 72. Conversely, if a lower-frequency current sunk by the transconductance amplifier 72 through the resistor 92 increases, and if the increase lasts long enough such that the frequency of the increase is within the passbands of the low-pass filters 94 and 96, then the offset-compensation circuit 60 generates, from the noninverting input node to the inverting input node of the transconductance amplifier 72, a positive voltage that tends to reduce toward or to 0 A the magnitude of the current sunk by the transconductance amplifier 72.

Still referring to FIGS. 3-5, alternate embodiments of the operation of the error-amplifier 52 are contemplated. For example, the power-supply controller 14 can compensate for the input-offset voltages of the transconductance amplifiers 70 and 72 in a manner different from the manners described above. For example, instead of including two DACs 62 and 64, the power-supply controller 14 may include a single DAC for generating the voltage $V_{REF}$ in a manner that also compensates for any non-zero input offset of the transconductance amplifier 70.

Figure 6:
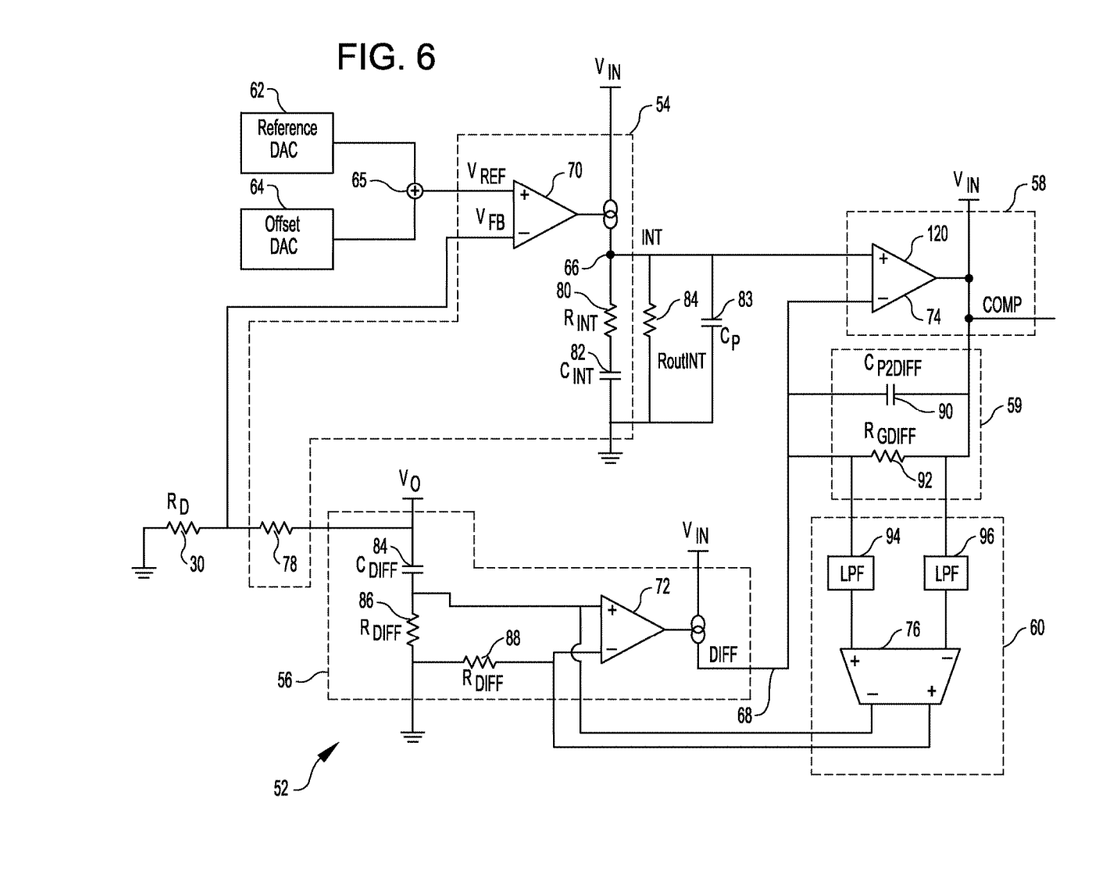
FIG. 6 is a diagram of another embodiment of the error-amplifier circuit of FIG. 2.

FIG. 6 is a diagram of another embodiment of the error-amplifier circuit 52 of FIG. 2. The embodiment of FIG. 6 may be topologically and operationally similar to the embodiment of FIG. 3 except that the operational transconductance amplifier 74 of FIG. 3 is replaced with an operational amplifier 120 in the embodiment of FIG. 6.

Figure 7:
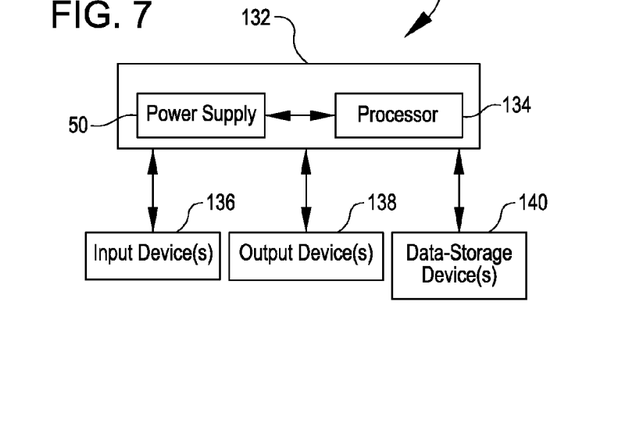
FIG. 7 is a diagram of a system that incorporates the power supply of FIG. 2, according to an embodiment.

FIG. 7 is a block diagram of an embodiment of a computer system 130, which incorporates the power supply 50 of FIG. 2, according to an embodiment. Although the system 130 is described as a computer system, it may be any system for which an embodiment of the power supply 50 is suited.

The system 130 includes computing circuitry 132, which, in addition to the power supply 50 of FIG. 2, includes a processor 134 (e.g., a microprocessor or microcontroller) powered by the supply (i.e., the processor is a load of the supply), at least one input device 136, at least one output device 138, and at least one data-storage device 140.

In addition to processing data, the processor 134 may program or otherwise control the power supply 50. For example, one or more of the functions of the power-supply controller 14 may be performed by the processor 134.

The input device (e.g., keyboard, mouse) 136 allows the providing of data, programming, and commands to the computing circuitry 132.

The output device (e.g., display, printer, speaker) 138 allows the computing circuitry 132 to provide data in a form perceivable by a human operator.

And the data-storage device (e.g., flash drive, hard disk drive, RAM, optical drive) 140 allows for the storage of, e.g., programs and data.

Still referring to FIG. 7, although described as powering the processor 134, the power supply 50 may provide power to one or more other components of the system 130 instead of, or in addition to, the processor. Furthermore, one or more components (e.g., the power-supply controller 14) of the power supply 50 may be disposed on a same integrated circuit die as other components (e.g., the processor 134) of the system 130.

Figure 8:
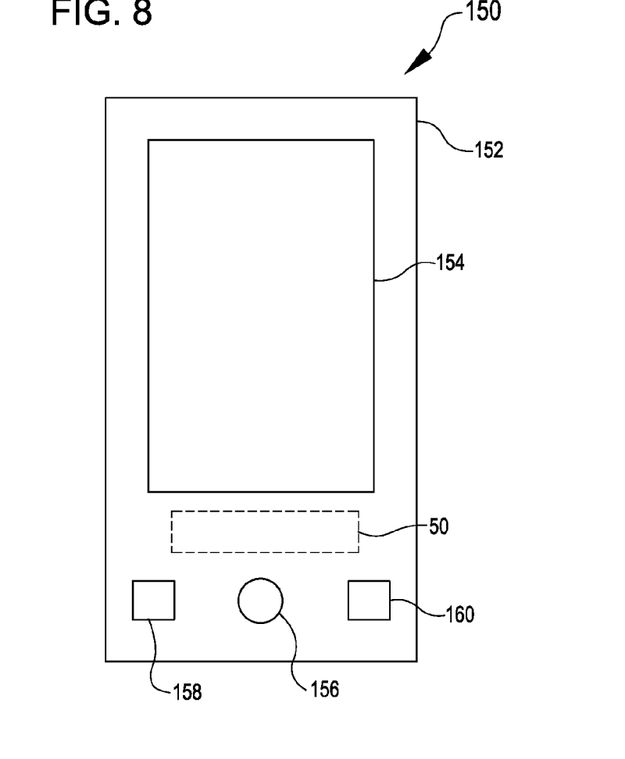
FIG. 8 is a diagram of a smart phone that incorporates the system of FIG. 7, or that incorporates the power supply of FIG. 2 separate from the system of FIG. 7, according to an embodiment.

FIG. 8 is a block diagram of an embodiment of a smart phone 150, which incorporates the power supply 50 of FIG. 2, and which may incorporate the computer system 130 of FIG. 7, according to an embodiment. In addition to the power supply 50, the smart phone 150 includes a hand-holdable housing 152, a display 154, at least one control (e.g., volume, menu) 156, at least one microphone 158, and at least one speaker 160. Furthermore, the smart phone 150 may include one or more other conventional smart-phone features.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. An amplifier, comprising:
   a first stage having a first passband and configured to generate a first output signal in response to first and second input signals;
   a second stage having a second passband that is higher in frequency than the first passband and configured to generate a second output signal in response to third and fourth input signals, wherein the first, second, third and fourth input signals are all separate and different from each other;
   a third stage having a first input node coupled to receive the first output signal, a second input node coupled to receive the second output signal, and an output node; and
   a feedback network coupled between the second input node and the output node of the third stage.

2. The amplifier of claim 1 wherein the first stage circuit, second stage, and third stage each include a respective operational transconductance amplifier stage.

3. The amplifier of claim 1 wherein:
   the first stage includes an integrator stage;
   the first output signal includes a first output current;
   the second stage includes a differentiator stage;
   the second output signal includes a second output current; and
   the third stage includes a buffer stage.

4. The amplifier of claim 1 wherein the third stage is configured to generate, on the output node, an error signal in response to the first and second output signals.

5. The amplifier of claim 1 wherein the feedback network includes:
   a resistor coupled between the second input node and the output node of the third stage; and
   a capacitor coupled in parallel with the resistor.

6. The amplifier of claim 1 wherein one of the first and second input signals, and the third and fourth input signals, are related to a regulated output signal.

7. The amplifier of claim 1, further comprising an offset compensation stage coupled to the feedback network and to the second stage and configured to reduce a signal offset of the second stage.

8. The amplifier of claim 1, further comprising an offset compensation stage coupled to the feedback network and to the second stage and configured to reduce an input offset of the second stage.

9. The amplifier of claim 1, further comprising an offset compensation stage coupled to the feedback network and to the second stage and configured to reduce an input voltage offset of the second stage.

10. The amplifier of claim 1, further comprising:
    wherein the second stage includes a first input node configured to receive the first input signal and a second input node configured to receive the second input signal; and
    a fully differential offset compensation stage having a first input node coupled to the first input node of the third stage, a second input node coupled to the output node of the third stage, a first output node coupled to the first input node of the second stage, and a second output node coupled to the second input node of the second stage.

11. A power supply controller, comprising:
    an error amplifier circuit, including
    a first stage having a first passband and configured to generate a first intermediate signal in response to first and second input signals;
    a second stage having a second passband that is higher in frequency than the first passband and configured to generate a second intermediate signal in response to third and fourth input signals, wherein the first, second, third and fourth input signals are all separate and different from each other;
    a third stage having a first input node coupled to receive the first intermediate signal, a second input node configured to receive the second intermediate signal, and an output node, the third stage configured to generate an output signal on the output node; and
    a feedback network coupled between the second input node and the output node of the third stage.

12. The power supply controller of claim 11 wherein
the first stage includes an integrator stage having a first operational transconductance amplifier;
the second stage includes a differentiator stage having a second operational transconductance amplifier; and
the third stage includes a combiner stage having a third operational transconductance amplifier.

13. The power supply controller of claim 11, further comprising an offset compensation stage coupled to the feedback network and the second stage and configured to reduce an input offset of the second stage.

14. A power supply, comprising:
an output node configured to carry a regulated output signal;
a phase including an inductor coupled to the output node; and
a power supply controller coupled to the inductor and including:
an error amplifier circuit, including
a first stage having a first passband and configured to generate a first intermediate signal in response to a reference signal and the regulated output signal;
a second stage having a second passband that is higher in frequency than the first passband and configured to generate a second intermediate signal in response to the regulated output signal;
a third stage having a first input node coupled to receive the first intermediate signal, a second input node configured to receive the second intermediate signal, and a third stage output node, the third stage configured to generate an error signal on the third stage output node; and
a feedback network coupled between the second input node and the third stage output node of the third stage.

15. The power supply of claim 14 wherein the power supply controller further includes:
a comparator having a first node coupled the third stage output node, having a second node coupled to receive a sawtooth signal, and having a comparator output node; and
a drive circuit having an input node coupled to the comparator output node and having an output node coupled to the inductor.

16. The power supply of claim 14, further comprising an offset compensation stage coupled to the feedback network and to the second stage and configured to reduce an input voltage offset of the second stage.

17. A system, comprising:
a load; and
a power supply, including
an output node coupled to the load;
a phase including an inductor coupled to the output node; and
a power supply controller coupled to the inductor and including:
an error amplifier circuit, including
a first stage having a first passband and configured to generate a first intermediate signal in response to a reference signal and the regulated output signal;
a second stage having a second passband that is higher in frequency than the first passband and configured to generate a second intermediate signal in response to the regulated output signal;
a third stage having a first input node coupled to receive the first intermediate signal, a second input node configured to receive the second intermediate signal, and a third stage output node, the third stage configured to generate an error signal on the third stage output node; and
a feedback network coupled between the second input node and the third stage output node of the third stage.

18. The system of claim 17 wherein the load includes an integrated circuit.

19. The system of claim 17 wherein the power supply controller and the load are disposed on a same integrated circuit die.

20. The system of claim 17 wherein the power supply controller and the load are disposed on respective integrated circuit dies.

21. A method, comprising:
low pass filtering a difference between a reference signal and a first input signal to generate a first output voltage on a first input node of a first amplifier stage, the first input signal related to a regulated signal;
high pass filtering a second input signal to generate an output current through a network coupled between a second input node and an output node of the first amplifier stage, the second input signal related to the regulated signal, wherein the reference signal, the first input signal, and the second input signal are all separate and different from each other; and
combining with the first amplifier stage the first output voltage on the first input node and a second output voltage on the second input node.

22. The method of claim 21, further comprising:
wherein high pass filtering the second input signal includes high pass filtering the second input signal with a second amplifier stage;
generating with the network a network voltage in response to the output current; and
compensating for an offset of the second amplifier stage in response to the network voltage.

23. An amplifier, comprising:
a first differential amplifier stage having an offset and configured to generate a first output signal;
a second differential amplifier stage configured
to generate a second output signal in response to a difference between the first output signal and a third output signal, and
to generate a first feedback signal in response to the first and second output signals; and
an offset compensation stage configured to reduce the offset of the first amplifier stage in response to the first feedback signal.

24. The amplifier of claim 23 wherein the first differential amplifier stage includes a first operational transconductance amplifier stage.

25. The amplifier of claim 23, further comprising:
a third differential amplifier stage configured to generate the third output signal and having a first passband; and
wherein the first differential amplifier stage having a second passband that is higher in frequency than the first passband.

* * * * *